(12) United States Patent
Aluvala et al.

(10) Patent No.: US 11,356,295 B2
(45) Date of Patent: *Jun. 7, 2022

(54) PER-APP VIRTUAL PRIVATE NETWORK TUNNEL FOR MULTIPLE PROCESSES

(71) Applicant: VMware, Inc., Palo Alto, CA (US)

(72) Inventors: Suman Aluvala, Bangalore (IN); Sivasubramaniam Sivakumar, Bangalore (IN); Ben Joseph, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,202

(22) Filed: Mar. 22, 2021

(65) Prior Publication Data

US 2021/0211322 A1 Jul. 8, 2021

Related U.S. Application Data

(63) Continuation of application No. 16/128,548, filed on Sep. 12, 2018, now Pat. No. 10,958,480.

(30) Foreign Application Priority Data

Jul. 19, 2018 (IN) .............................. 201841027021

(51) Int. Cl.
*G06F 15/16* (2006.01)
*H04L 12/46* (2006.01)
*G06F 9/54* (2006.01)
*H04L 67/56* (2022.01)

(52) U.S. Cl.
CPC .......... *H04L 12/4641* (2013.01); *G06F 9/547* (2013.01); *H04L 67/28* (2013.01)

(58) Field of Classification Search
CPC ...... H04L 12/4641; H04L 67/28; G06F 9/547
USPC .................................. 709/202–203, 227–228
See application file for complete search history.

(56) References Cited

U.S. PATENT DOCUMENTS

| 6,922,727 | B2* | 7/2005 | Banerjee | H04L 69/162 |
| | | | | 709/227 |
| 8,005,962 | B2* | 8/2011 | Song | H04L 61/6077 |
| | | | | 709/227 |
| 8,898,191 | B2 | 11/2014 | Kass | |
| 10,749,808 | B1 | 8/2020 | Maccarthaigh | |
| 10,855,725 | B2* | 12/2020 | Pai | H04L 12/4641 |
| 10,938,786 | B2* | 3/2021 | Lapidous | H04L 12/4633 |
| 10,958,480 | B2* | 3/2021 | Aluvala | H04L 12/4641 |

(Continued)

*Primary Examiner* — Bharat Barot
(74) *Attorney, Agent, or Firm* — Clayton, McKay & Bailey, PC (57) ABSTRACT

Examples described herein include systems and methods for creating a per-app virtual private network ("VPN") using hooking, even though an isolated process is used for networking functions. The isolated process can include networking functions of the WebView class for ANDROID. The application can start an HTTP proxy server to receive local HTTP requests. Then, the application can trigger a broadcast to the isolated process, causing the isolated process to route its HTTP requests to the HTTP proxy of the application. The application can then hook HTTP requests and send them to a virtual private network ("VPN") tunnel server. This can allow an application to securely connect to enterprise files or data even though the networking functions occur in the isolated process.

20 Claims, 4 Drawing Sheets

(56) References Cited

U.S. PATENT DOCUMENTS

| | | |
|---|---|---|
| 2005/0246718 A1 | 11/2005 | Erlingsson |
| 2007/0094495 A1 | 4/2007 | Hunt |
| 2010/0125897 A1 | 5/2010 | Jain |
| 2010/0223613 A1 | 9/2010 | Schneider |
| 2013/0347072 A1* | 12/2013 | Dinha ................. H04L 67/28 709/227 |
| 2015/0146231 A1 | 5/2015 | Austin |
| 2016/0072895 A1 | 3/2016 | Bailey |
| 2016/0285832 A1* | 9/2016 | Petrov ................. H04L 67/32 |
| 2017/0310445 A1 | 10/2017 | Kalligudd |
| 2019/0141015 A1 | 5/2019 | Nellen |
| 2020/0013250 A1* | 1/2020 | Jakubek ............... H04L 63/062 |

* cited by examiner

PER-APP VIRTUAL PRIVATE NETWORK TUNNEL FOR MULTIPLE PROCESSES

RELATED APPLICATIONS

This application is a continuation of U.S. patent application Ser. No. 16/128,548, entitled "PER-APP VIRTUAL PRIVATE NETWORK TUNNEL FOR MULTIPLE PROCESSES," filed Sep. 12, 2018, which claims benefit of priority under 35 U.S.C. 119(a)-(d) to Foreign Application Serial No. 201841027021 filed in India entitled "PER-APP VIRTUAL PRIVATE NETWORK TUNNEL FOR MULTIPLE PROCESSES," on Jul. 19, 2018, by VMware, Inc., both of which are incorporated by reference in their entireties for all purposes.

BACKGROUND

Companies today often require employees to connect to an enterprise network to access secured intranet sites, internal content repositories, or other corporate network shares. Providing widespread access to enterprise data is challenging from a security standpoint. Many common device-level virtual private network ("VPN") technologies lack the ability to selectively provide access between different applications (also referred to as "apps") on mobile devices. This inability produces two key concerns: loss of enterprise data into personal applications and the possibility of malware infecting an enterprise network or data center.

A per-app VPN tunnel provides a secure method for organizations to allow both internally built and public applications to access enterprise resources on a per-app basis. To do this, the application uses runtime function hooking to replace an application programming interface ("API") function with an alternative function during runtime of the application. In an enterprise mobility management ("EMM") system, runtime function hooking can be used by a tunneling application to establish VPN access to enterprise files and data for that application process. For example, an unmanaged device, such as a phone, tablet, or laptop, can use ANDROID's Tunnel software development kit ("SDK") to achieve a per-app tunnel through use of runtime function hooking.

However, an application can only perform hooking within its own application process. This is because the application must have access to the function call it is replacing. If the functions instead are running in a separate isolated process, then the application cannot replace them with an alternate function.

Newer versions of ANDROID have caused some classes of the operating system ("OS") to run certain functions in isolated processes. For example, ANDROID Nougat (7.0) and above causes the WebView class to run its rendering and networking in an isolated process for security and performance reasons. Therefore, even though WebView executes as part of an application, the networking processes involved are isolated from the application process. As a result, the application cannot hook functions in the isolated process as required for a per-app VPN. This effectively breaks the per-app VPN capabilities of such applications.

As a result, a need exists for a per-app VPN that works when an application relies on multiple processes that are isolated from one another.

SUMMARY

Examples described herein include systems and methods for creating a per-app VPN tunnel even when networking function calls are isolated in a different process than the application process.

In one example, an application process executes on a user device. The application process can be, for example, an enterprise application such as an email application or document-editing application. The application process can rely on an isolated process for network requests. For example, a class such as WebView can cause an isolated process to execute in some versions of ANDROID, such as ANDROID 7.0. The examples also apply to other operating systems, such as LINUX.

The application process can start a proxy server. Starting a proxy server can include any mechanism or command to turn on a proxy server on the user device. The proxy server can run as part of the application process and can act as an intermediary for network requests going to and from the application process to destinations on the Internet. The proxy server can be a hypertext transport protocol ("HTTP") proxy that forwards network requests to a tunnel server, in one example. The tunnel server can then send the requests in a secure fashion to a backend system to send or receive enterprise data.

To gain access to the network requests, the application process can set the isolated process to use the proxy server. This can cause the isolated process to send its network requests to the proxy server of the application process, where they can be hooked by the application process. In one example, WebView has a mechanism where it looks for a WIFI proxy server on the user device. The application process can use an API to send a system broadcast to WebView, causing WebView to update itself to use the proxy server for network requests.

When the isolated process, such as a WebView process, makes a network request, it can send the network request to the proxy server. The proxy server can recognize which network requests to hook. For example, the network request can include a user identifier. The user identifier can uniquely identify the application making the network request. The isolated process, being initiated by the application process, can have the same user identifier as the application process. Therefore, the proxy server can look for network requests having an initiator with the user identifier of the application process.

Because the proxy server is part of the application process, the application process can hook the network request. The hooked network request can be replaced by an alternate network function. For example, the alternate network function can be used to connect to a VPN tunnel server.

The VPN tunnel server can connect to a backend destination server where the application process is attempting to exchange information. For example, for an email application, the backend server can be an email server. For a text-editor application, the backend server can be a content server. The destination server can send and receive traffic with the VPN server, which in turn can send information to the application process.

These stages can be performed as part of a computer-implemented method. Alternatively, they can execute in a device or system that retrieves instructions from memory for execution with a processor. These stages can be stored on a non-transitory, computer-readable medium for execution by a processor.

In one example, a system can allow applications to continue operating normally when hooking is otherwise broken. For example, applications using WebView can be broken as devices upgrade to ANDROID 7.0 or higher and network requests are isolated. An example herein can allow the per-app VPN to continue to work even when an isolated process is created for network requests.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Increasing importance has been placed on allowing employees to work anytime, anywhere. This means users need access to enterprise resources on their user device, such as a phone, tablet, laptop, or other processor-based device. Enterprises need control over these interactions beyond that of a regular VPN. Instead, an application can connect securely to an enterprise server through use of a per-app VPN. Unlike a regular VPN, a per-app VPN can be specific to the application or user, or both. The enterprise can then decide access rights for the application or user, providing more granular control over resource access.

A per-app VPN can be achieved by hooking network calls. Network calls are functions related to communicating over a network, also referred to as network requests. Hooking involves replacing the network calls with alternate functions. These alternate functions can reroute the network calls to a VPN tunnel server. The VPN tunnel server can encrypt traffic and enforce rules on the application's access to resources. As an example, the VPN tunnel server can ensure the user has access rights and is in compliance with rules that are part of an EMM system. If the user is allowed access, the VPN tunnel server can request a resource, such as a file or data, from a destination server associated with the enterprise. VMWARE TUNNEL is one such VPN tunnel server, providing IT with the controls and security mechanisms necessary to enable enterprise access for users on a per-app basis. With support for both Android and iOS devices, VMWARE TUNNEL enables organizations to move away from the shortcomings of traditional app tunneling solutions by featuring an enhanced user experience, ease of deployment and the necessary stability for mission-critical use cases like corporate access.

However, some operating systems can cause networking functions to operate in an isolated process not accessible by the application process. For example, ANDROID 7.0 and later causes the WebView class to run networking functions in an isolated process. WebView has traditionally been used to hook and redirect network calls, but applications can no longer do so when the network calls are isolated from the application process.

The application process can start a proxy server. The proxy server can execute as part of the application process. Using an API, the application process can also notify the isolated process to use the proxy server for its network calls. For example, the application process can cause the OS to broadcast a command to the isolated process, causing the isolated process to check for the internal proxy server and route its network traffic to the proxy server.

The application process can then hook the network calls at the proxy server. These hooked calls can be sent to the VPN tunnel server, which can execute on the user device or at a remote server. The VPN tunnel server can secure communications with the enterprise servers using Transport Layer Security ("TLS") protocol and Secure Sockets Layer ("SSL") protocol, in an example.

This process can be transparent to the end-user. In one example, a management agent on the user device downloads the VPN tunnel application from a management server. The VPN tunnel server can be managed by the management agent. An application process that is flagged to use the per-app VPN can automatically connect through the VPN tunnel server without prompting the user for any sort of information.

Figure 1:
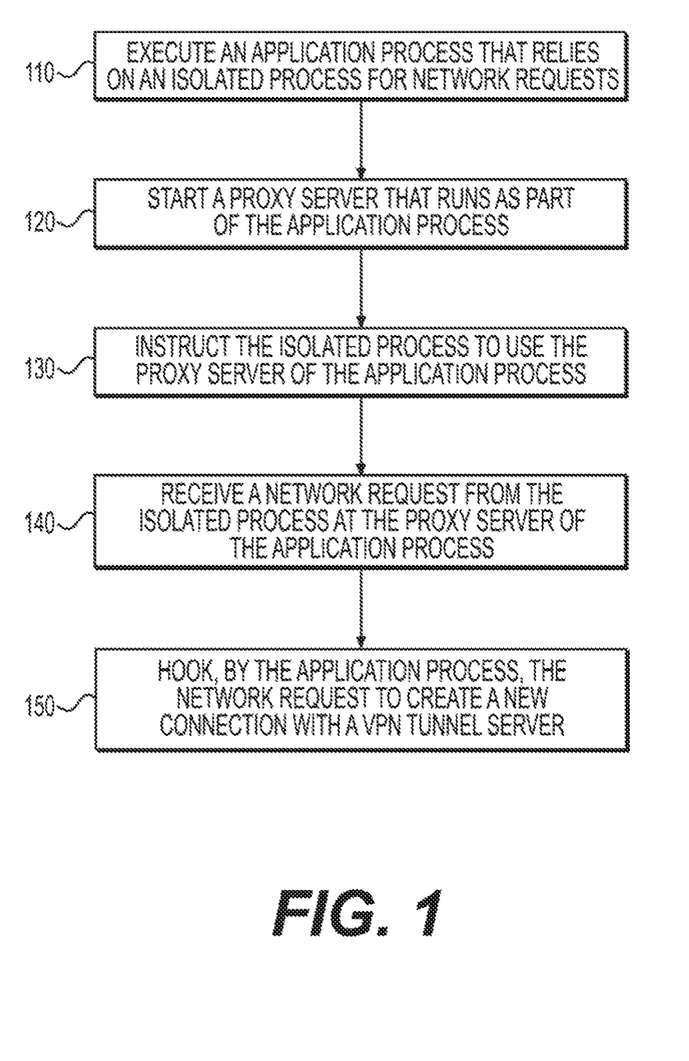
FIG. 1 is a flowchart of an exemplary method for a per-app VPN for an application with networking functions in an isolated process.

FIG. 1 is an example method for per-app VPN connections even when networking calls are isolated from the application process. At stage 110, the user device can execute an application process that relies on an isolated process for network calls (i.e., network requests). For example, a user can open an email or word processing application on the user device. The application process can include functionality for retrieving enterprise files. However, the application can rely on a class such as WebView for ANDROID that isolates network calls. These network calls need to be hooked and routed to the VPN tunnel server, which negotiates connections and communications with the backend enterprise resources.

At stage 120, the application process can start a proxy server. The proxy server can run as part of the application process. The proxy server can be an intermediary for other applications seeking resources from other servers. A web proxy can facilitate access to content over the Internet. However, in this context, the purpose of the proxy can be to receive network requests within the application process, giving the application process access to those otherwise isolated network calls. In one example, the proxy server can be an HTTP proxy supported by a browser on the user device, such as CHROME or FIREFOX.

At stage 130, the user device can instruct the isolated process to update itself and use the proxy server of the application process. WebView and similar classes can have a mechanism to detect a WIFI proxy on the user device and adjust to use that proxy. If the WIFI proxy changes, the isolated process can recognize this and change its own proxy settings.

The application process can broadcast a system proxy change to cause the isolated process to change its proxy to the proxy server of the application process. A VPN tunnel SDK can include code for triggering the broadcast within the application process. Both the application process and the isolated process can update themselves to use the proxy server. The system broadcast can be kept local within the application, affecting the application process and isolated process without affecting the entire user device.

In one example, the OS can include an SDK for a system proxy change. The application process can use the SDK to broadcast to the isolated process. This proxy broadcast is triggered within the application process, meaning it is only received within the application. Because the isolated process is within the process, it receives the broadcast and is triggered to use the proxy server in the application process.

This can cause the isolated process to route its network calls to the proxy server of the application process.

In another example, the application process can make an API call to the isolated process related to routing network requests to a proxy server. In this example, the application process can make an API call to the isolated process that causes the isolated process to send HTTP requests to the proxy server of the application process.

At stage 140, the isolated process sends network requests to the proxy server. These network requests can be received at the proxy server of the application process. The application process has real-time access to the network requests at its proxy server.

At stage 150, the application process can hook the network request. The proxy server can recognize which network requests to hook in one example. Each network request can contain a user identifier ("UID"). The UID can uniquely identify an application. Since the isolated process is started by the application process, it can share that same UID. In other words, the application process and isolated process can have the same UID. Therefore, the proxy server can handle network requests that also have that UID, ensuring that the network request is coming from the isolated process.

The proxy server can also use the local address or remote address of the network request to determine which network functions to hook and which to ignore, in an example. The proxy server can look at the remote address to ensure the traffic is from the isolated process or VPN tunnel server, in an example.

Based on the hooking, the application process can contact a VPN tunnel server to fulfill the network request at a destination server. The VPN tunnel server can act as an intermediary that enforces rules on communications between the user device and the destination server. The destination server can contain sensitive enterprise resources, such as files or data.

Contacting the VPN tunnel server based on the hooking can appear seamless to the user and can involve replacing functions at runtime to redirect traffic to the VPN tunnel server. This process can use real-time function hooking to replace an API function, such as a networking function of the OS or a library with another one at runtime. In one example, a tunnel SDK integrated into the application process can hook various network requests. The tunnel SDK can include calls specifically for connecting to the VPN tunnel server. As an example, the application process can hook the socket( ) function using the tunnel SDK. Socket( ) is a function in the standard ANDROID library that classes such as WebView can use for establishing a network connection. Using hooking, WebView's socket( ) and other network requests can be replaced with calls to tunnel SDK functions. In this example, WebView can forward socket( ) to the proxy server, which can hook and replace the function with an alternative hooking function, such as VM_socket( ).

The alternate functions used by the application process can create a new network connection with the VPN tunnel server. For example, VM_socket( ) can establish a socket connection with the VPN tunnel server. The tunnel SDK can include built-in connection information for communicating with the VPN tunnel server in one example. Subsequent network requests hooked by the application process can use the socket opened with the VPN tunnel, in an example. The alternate functions can also enforce network rules. These rules can be established by a management server of an EMM system, in one example.

These examples can apply to more than just ANDROID's class. For example, other network clients include JAVA's URLConnection, APACHE HTTP Client, and OKHttpClient. These network clients can all make network requests that could be isolated by an OS in a separate process. Likewise, socket( ) is just one of several network calls that can be hooked at the proxy server. Any HTTP request can be routed to the proxy server and hooked using the tunnel SDK or other hooking functions. Any system networking calls can be hooked, in an example.

The alternate function can open a socket to a destination server and send and receive information to and from the destination server. The alternate function can first determine if the destination server is internal on a local network or if it must connect over an external network, such as the Internet, to reach the destination server. To connect over the Internet, a VPN can be used. The traffic can be sent to a VPN tunnel server, which in turn sends the traffic to the destination server. The destination server can respond and send information back to the VPN tunnel server, which in turn can send the information back to the application process. The communication between the application process and the VPN tunnel server can be done using, for example, the tunnel SDK.

The VPN tunnel server can be a separate application that executes on the user device in an example. Alternatively, the VPN tunnel server can execute separately from the user device, in an example. In that example, the tunnel SDK can be used to encrypt and decrypt traffic between the application and the VPN tunnel server.

Figure 2:
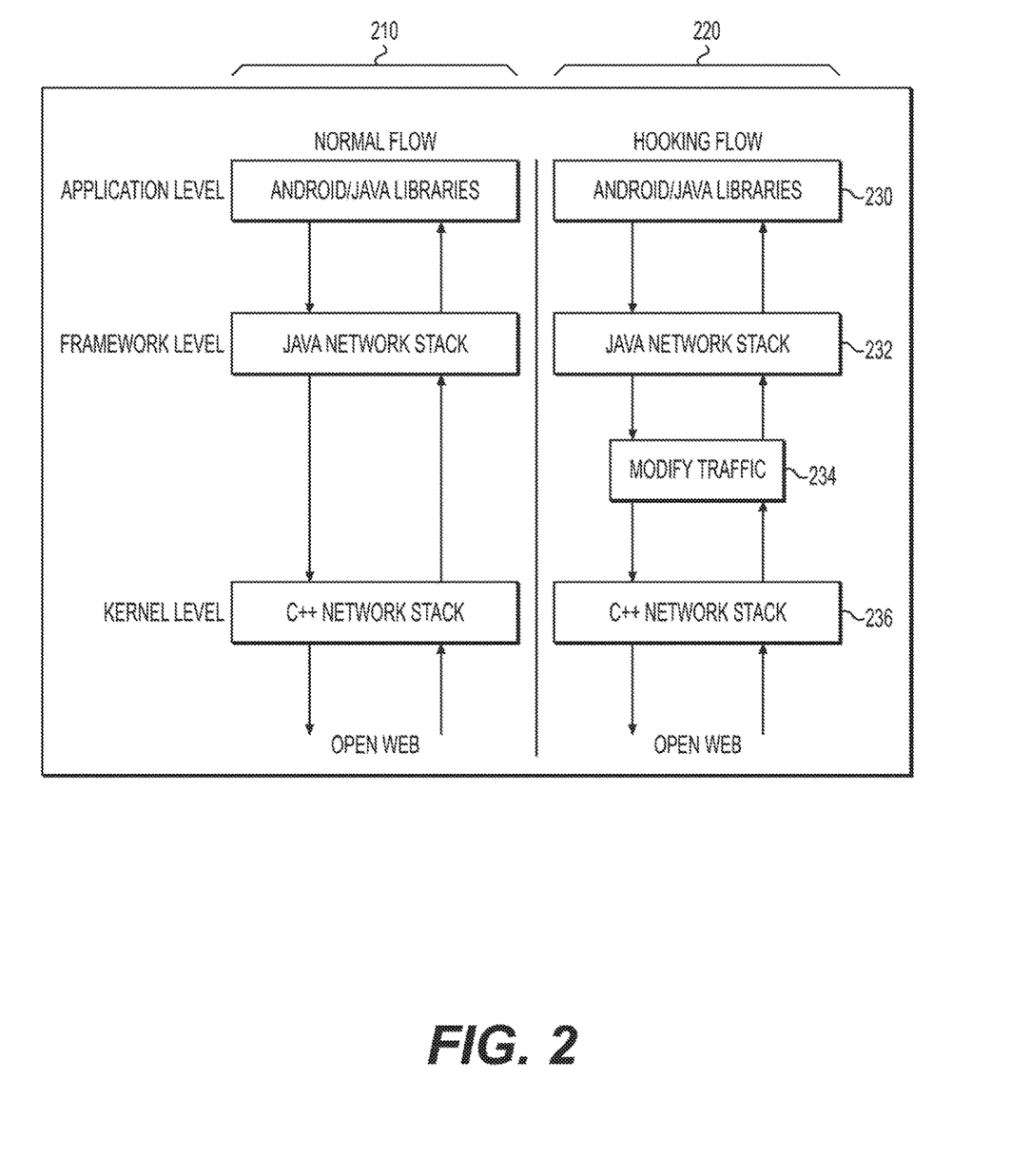
FIG. 2 is a flowchart of an exemplary method for hooking a networking function.

FIG. 2 is an example flowchart illustrating hooking within a software stack. Two networking flows 210 and 220 are presented. These flows 210 and 220 illustrate interactions on a user device for an application's network requests, particularly between an application level, framework level, and kernel level. The normal flow 210 does not include hooking for networking calls. The hooking flow 220 includes hooking at stage 234.

At stage 230, ANDROID or JAVA libraries can be implemented by an application process at the application level. The application level can represent high level code utilizing functionality provided by library modules. The application process can use other libraries as well—ANDROID and JAVA libraries are just exemplary. The application code can import libraries with various classes and functionality. One such class is WebView. WebView functions can be instantiated for use in accessing a network resource, such as a resource of an enterprise.

At stage 232, a JAVA network stack can be implemented at the framework level. Framework-level code can represent libraries providing reusable services. Network functionality is one example of the types of services that can be included at the framework level. Both flows 210 and 220 can implement a JAVA network stack or some other type of networking framework. The network stack can be used by the application, but the network stack interacts with the OS.

The OS runs at the kernel level. At stage 236, the OS can execute its own network stack that contains fundamental operations for networking features of the user device. The OS can determine how aspects of the framework-level network stack operate. The framework-level network stack can interact with the OS network stack to perform networking functions.

In the hooking flow, additional stage 234 is used to modify network traffic. This stage can be between the framework level and kernel level in an example. For example, the tunnel SDK can implement various functions from the framework-level network at stage 232, such that a network request is replaced with an alternate function. The alternate function can, for example, determine if the network function should be routed through the VPN tunnel server. If the destination server is local, this can be bypassed. But if the destination server is not on the same network as the user device, the alternate function can send the network request to the VPN tunnel server. In one example, the tunnel SDK can be used to authenticate a connection with the VPN tunnel server and to facilitate communications between the application process and VPN tunnel server.

Figure 3:
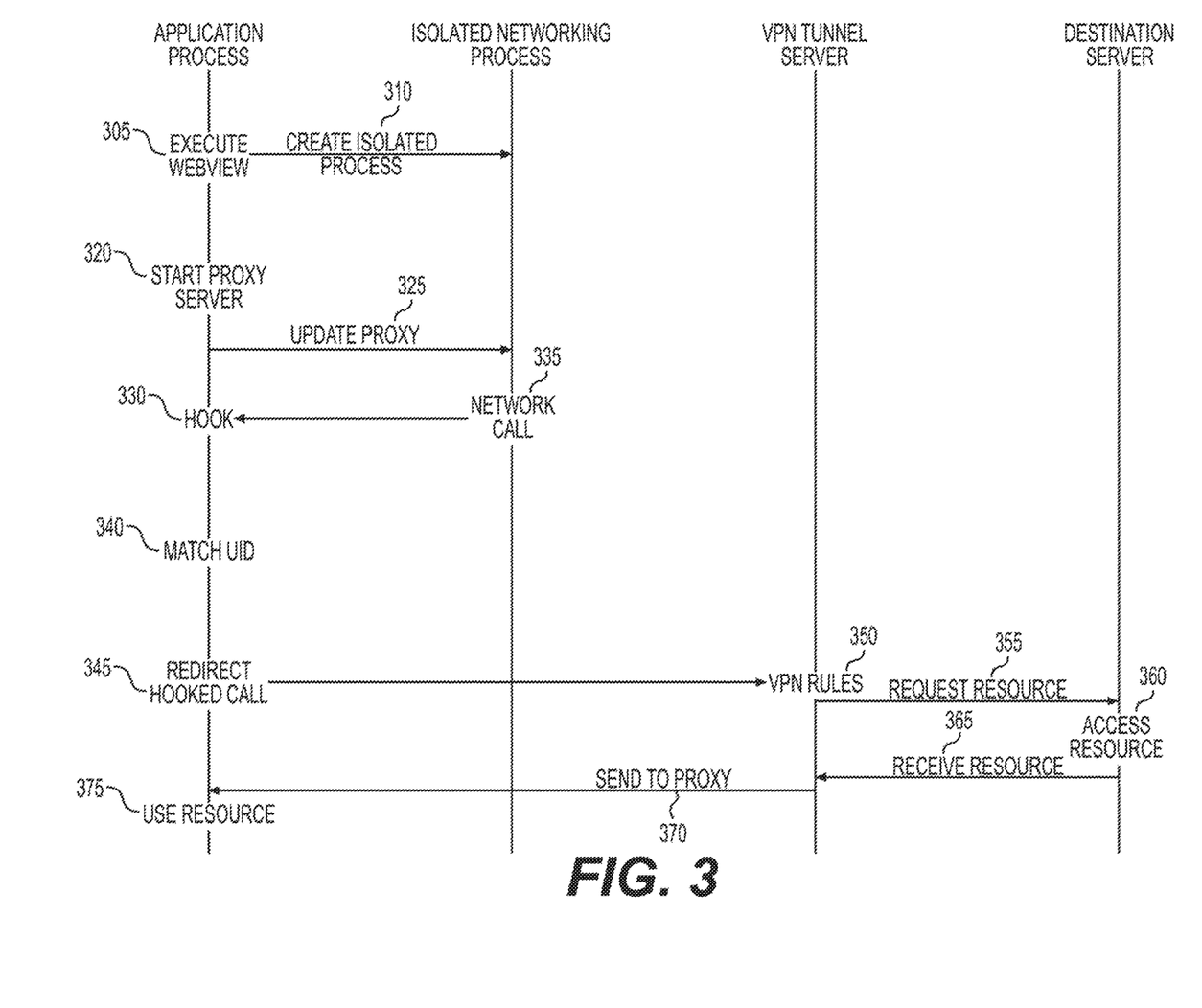
FIG. 3 is an exemplary sequence diagram for setting a per-app VPN for an application with networking functions in an isolated process.

FIG. 3 is an exemplary sequence diagram for per-app VPN when networking functions are in an isolated process. At stage 305, the application process can execute WebView. WebView can be a component in ANDROID that acts as a mini web browser to run mobile applications. WebView can access native APIs, such as those of iOS, ANDROID, WINDOWS, OS X, or LINUX. WebView can be configured to run full screen or in a smaller window. The application process can use WebView to wrap the application or to provide customized technology, such as modified network requests. Although WebView is used as an exemplary OS component, other OS components can be substituted through the method described in FIG. 3.

At stage 310, WebView can create an isolated process for networking functions. This can be dictated by the OS version, which may be out of the user's or administrator's control. If the OS dictates that WebView creates an isolated process, the hooking can require additional steps as discussed herein.

At stage 320, the application process can start a proxy server. In one example, the application process can first check the SDK or OS version to determine whether a proxy server will be needed. For example, not all OS versions or SDKs will create an isolated process for network functions of WebView. For those that do, the proxy server can be started. The proxy server can be part of the application process and run on the user device. The proxy server can have a port and host address associated with the application process, in an example.

Once the proxy server starts, the application process can also update the proxy setting of the isolated process at stage 325. To do this, the application process can use an API available for the OS or for WebView to trigger a system broadcast to the isolated process. The application process can provide, in one example, the address and port of the proxy server to the isolated process. This can cause the isolated process to set itself to send and receive network requests (i.e., network calls) to and from the proxy server of the application process.

At stage 335, the isolated process can make a network call. The network call can be based on activities in the application process. Nevertheless, the network call can be isolated from access by the application process itself. Example network calls include socket( ) bind( ) and others. However, because the proxy was updated at stage 325, the isolated process can send the network call to the proxy server of the application process.

As a result, at stage 330 the application process can hook the network call. This can include identifying which network calls to hook at stage 340 by matching UIDs. For example, network calls originating at the isolated process have the same UID as the application process since the application created the isolated process. Therefore, network requests having this UID can be hooked and those with other UIDs can be ignored, in an example.

To hook the network call, the application process can use a tunnel SDK. The tunnel SDK can include alternate functions to use in place of the hooked network calls. These alternate functions can redirect network calls to a VPN tunnel server in a per-app VPN setup. In one example, the alternate function can determine whether the destination server is local to the application process or not. If not, network traffic can be routed to the VPN tunnel server for sending to the destination server, at stage 345. The tunnel SDK can include connection information for communicating with the VPN tunnel server, which can execute on the user device.

The VPN tunnel server can be one or more physical servers located remotely from the user device and application process. Alternatively, the VPN tunnel server can execute as part of a tunnel application on the user device, in an example. For example, the tunnel application can be installed separately from the application that includes the application process and isolated process. The application process can communicate with the tunnel application using the tunnel SDK, in an example. This can allow multiple different applications to use per-app VPN functionality.

At stage 350, the VPN tunnel server can enforce different VPN functionality for different applications. For example, VPN rules can be implemented by the VPN tunnel server to determine which applications can access a destination server and under what circumstances. The VPN tunnel server can receive VPN rules from a management server of an EMM system in one example. The VPN rules can govern communications between user devices and the destination servers of the EMM system. For example, the VPN server can have a list of user devices and applications that are allowed to communicate with various destination servers. The VPN server, therefore, can help block unauthorized access from certain devices or applications. Additionally, the VPN rules can change based on a location of a user device, a time of day, and other factors. The VPN rules can also include connection information to the destination servers. This can effectively prevent the user device from having direct access to connection information, providing an extra layer of security for enterprise resources (e.g., data).

The VPN rules can be device specific or user specific and can be part of a profile that is maintained by a management server of an EMM system. These profiles can include information associated with establishing a VPN connection between the user's device and the management server or another destination server within the EMM system. The profile can include, for example, an indication of whether a particular application requires a VPN connection in order to access particular data. The profile can also include credentials for making the VPN connection. Credentials can differ for different destination servers. Profiles can be stored at the management server, VPN server, user device, or a combination thereof.

Additionally, some users can be prohibited from contacting particular destination servers. For example, a user who is a marketing employee may not have access to a repository that is reserved for executives. In one example, VPN rules can include geofences, such that VPN functionality only applies when a user device is not at the office. Geofences can also be used to enforce zones where no communication with a destination server is allowed.

Based on the VPN rules, at stage 355 the VPN tunnel server can forward a network request to the destination server at stage 355. The VPN tunnel server can use connection information specified by the application process, such as an address of the destination server or a string that includes a resource request. The resource request can be used to access a resource at the destination server at stage 360, or to send a resource to the destination server. The resource can be a document, email, or other enterprise data. The VPN server can receive the resource at stage 365, then send it back to the application process at stage 370. This can include sending the resource to the application process through the proxy server.

The VPN tunnel server can pass the response through to the user device using the per-app VPN of the application process. In some examples, the process involving the tunnel VPN server is kept invisible to the user device. For example, the user may only be aware of their email request from an email application and the resulting response received at the user device.

At stage 375, the application process can access and use the resource. This can include displaying an email to the user or opening an enterprise document.

Figure 4:
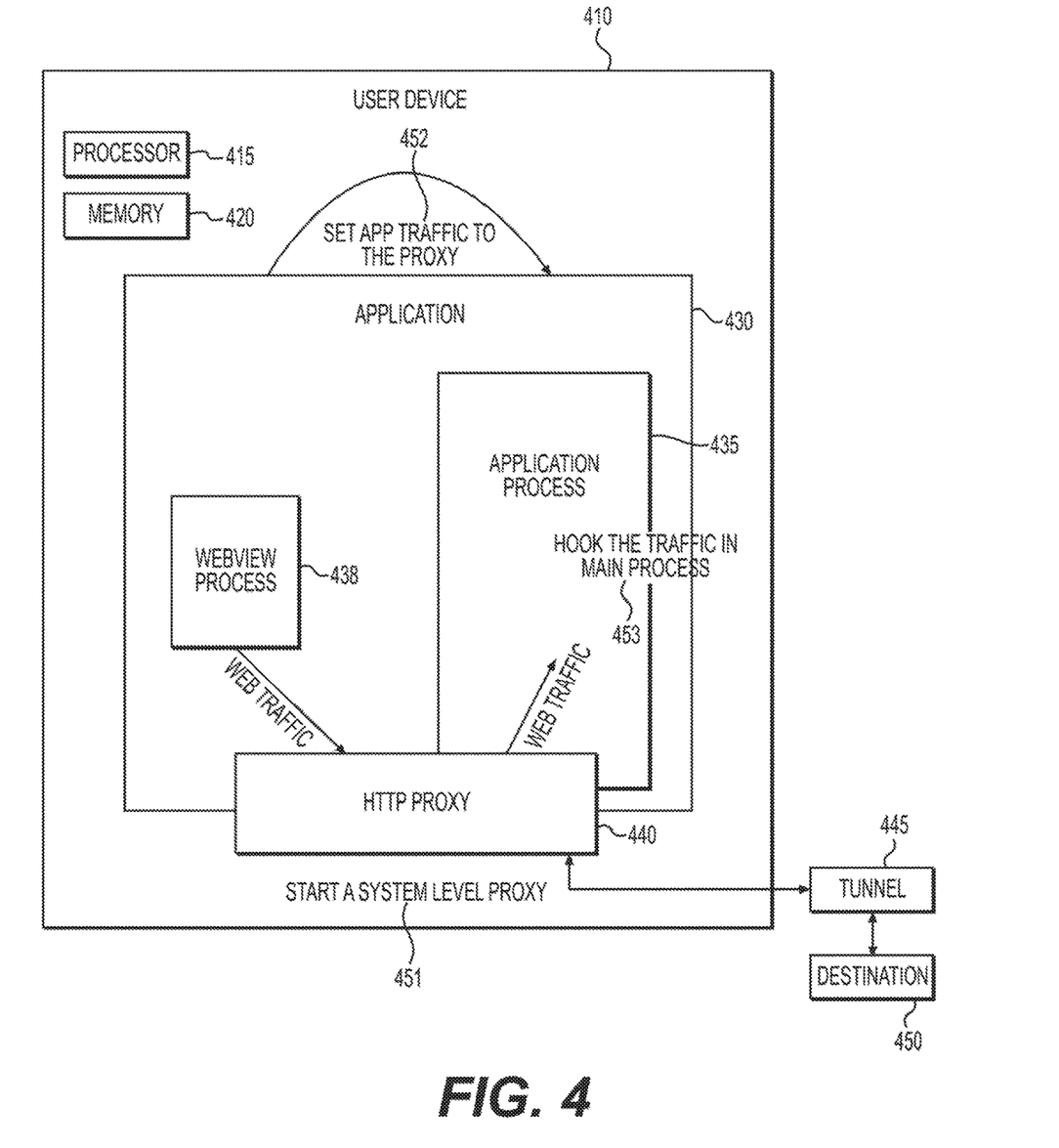
FIG. 4 is an exemplary illustration of system components.

FIG. 4 is an exemplary illustration of system components. User device 410 can be a tablet, phone, laptop, personal computer, or any other processor-based device. The user device 410 can include one or more processors 415 that executes instructions stored in a non-transitory, computer-readable medium 420. This can cause an application 430 to run on the user device 410.

The application 430 can be any application that accesses enterprise data (e.g., a resource). These include email applications, applications for creating and editing documents, applications for tracking work or sales activities, applications for developing software or tracking edits or versions of the software, and others.

The application 430 can also be a management agent that communicates with a management server of the EMM system. For example, the management agent can ensure that the user device 410 is compliant with compliance rules of the EMM system. The compliance rules can include blacklisted processes or applications that cannot execute while other managed processes operate, or cannot execute on the device at all. Other compliance rule examples include whether the OS is modified (rooted or jailbroken), whether the management agent is modified, whether a profile used by the management agent is missing or modified, and whether disallowed application settings are enabled. Other compliance violations can include invalid user credentials, an expired certificate, credentials that do not meet security requirements, geofence violations, or the use of unsecure communication channels for a service requiring secure communication. Other additional compliance rules are possible. When a compliance rule is violated, the management agent can take remedial actions such as blocking an application or process, revoking permissions, uninstalling software, or wiping the user device 410, as appropriate.

The application 430 can have a main process, referred to as the application process 435. The application process 435 can generally include specific functionality for the application 430. The application process 435 can rely on libraries to carry out the functionality, such as network libraries.

In one example, the application process 435 can instantiate a WebView component. Depending on the OS version or SDK, WebView can spawn an isolated process 438 for networking functionality, among other things. The isolated process 438 can be part of the application 430, yet isolated from the application process 435. This means that the application process 435 does not have direct access to functions being performed by the isolated process 438.

To enforce the per-app VPN, the application process 435 needs to hook and redirect network calls. This can be done by intercepting particular calls and implementing them with alternate functions that perform the redirection. However, when the application process 435 cannot directly access the network calls of the isolated process 438, the application process 435 cannot directly hook those network calls.

The application process 435 can instead start a proxy server 440 by performing stages 451. The proxy server 440 can be a system-level HTTP proxy in one example, responsible for sending and receiving HTTP traffic associated with the application 430. The application process can execute stage 452 to set network traffic of the application 430 to uses the proxy server 440. This stage 452 can include triggering a system broadcast to the isolated process 438 that causes the isolated process 438 to use the proxy server 440 for network requests, such as web traffic.

The proxy server 440 can be part of the application process 435. This can allow the application process to access the network requests, such as web traffic. The application process 435 can perform stage 453 for hooking the web traffic. This can include intercepting network requests with a UID matching the UID of the application 430, in an example. Those intercepted requests can then be implemented with alternate functions. The alternate functions can redirect the web traffic to a VPN tunnel server 445.

The VPN tunnel server 445 can execute separately from the application 430. The VPN tunnel server 445 can execute on the user device 410 in one example. For example, a tunnel application can enforce VPN rules received from a management server and act as an intermediary in negotiating communications between the application 430 and a destination server 450.

Alternatively, the VPN tunnel server 445 can be one or more physical servers located remotely from the user device 410. The VPN tunnel server 445 can include multiple servers, processors, and computing devices. In some examples, the VPN tunnel server 445 is a network of servers, some of which can be located remotely from one another. The VPN tunnel server 445 can provide a centralized connection between the user device 410 and destination servers 450, such as an email server. A destination server 450 can be part of an EMM system and can include sensitive enterprise data (also called resources). The destination server 450 can be one or more physical servers.

In one example, a management server can enforce rules, including VPN rules, that are defined as part of an EMM system. The management server can connect to the VPN tunnel server 445 and provide various types of information regarding the user devices 410, destination servers 450, and expected requests. For example, the management server can provide device identification information for one or more of the user devices 410. The device identification information can include, for example, an authentication certificate for the user device 410 that, when compared to an authentication certificate provided by the user device 410 itself, identifies the particular user device 410 to the VPN tunnel server 445. Any other type of authentication may be used as well, such as tokens, certificates, or passwords. The device identification information can also include an expected or default request identifier; for example, a default string for the email client installed on the user device 410. The device identification information can also include a custom request identifier, such as a custom string to be used for requests originating from a particular user device 130.

The user device 410 can establish a secure connection to the VPN tunnel server 445 using, for example, a per-app VPN. The connection can be specified as part of functions of a tunnel SDK, in an example. In some examples, the VPN tunnel server 445 can be dedicated to handling traffic between the user devices 410 and destination servers 450, such as an email server.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for creating a per-app virtual private network ("VPN"), comprising:
   executing an application process on a user device, the application process relying on an isolated process on the user device for network requests;
   registering a proxy server with an operating system of the user device, wherein the proxy server runs as part of the application process but separately from the isolated process;
   setting the isolated process to send its network requests to the proxy server;
   in an instance where the proxy server receives a network request from the isolated process and the network request is associated with the application process, replacing a socket function call with an alternate function that specifies an address of a VPN tunnel server; and
   contacting the VPN tunnel server to fulfill the network request at a destination server.

2. The method of claim 1, wherein the application process registers the proxy server with the operating system by making an application programming interface call to the isolated process.

3. The method of claim 1, wherein the isolated process handles networking capabilities for a WebView component of an ANDROID operating system.

4. The method of claim 1, wherein the proxy server or application process detects that the network request is associated with the application process by at least recognizing a user identifier that is associated with the application process.

5. The method of claim 1, the method further comprising:
   sending traffic from the proxy server to the VPN tunnel server, wherein the VPN tunnel server is configured to send the traffic to the destination server specified by the network request of the isolated process; and
   receiving response traffic at the proxy server, the response traffic being forwarded by the VPN tunnel server from the destination server.

6. The method of claim 1, wherein the proxy server only accepts network requests that include an identifier associated with both the application process and isolated process.

7. The method of claim 1, wherein the application process causes a browser executing on the user device to broadcast a proxy change to the isolated process, causing the isolated process to route the network request to the proxy server of the application process.

8. A non-transitory, computer-readable medium comprising instructions that, when executed by a processor, perform stages for creating a per-app virtual private network ("VPN"), the stages comprising:
   executing an application process on a user device, the application process relying on an isolated process on the user device for network requests;
   registering a proxy server with an operating system of the user device, wherein the proxy server runs as part of the application process but separately from the isolated process;
   setting the isolated process to send its network requests to the proxy server;
   in an instance where the proxy server receives a network request from the isolated process and the network request is associated with the application process, replacing a socket function call with an alternate function that specifies an address of a VPN tunnel server; and
   contacting the VPN tunnel server to fulfill the network request at a destination server.

9. The non-transitory, computer-readable medium of claim 8, wherein the application process registers the proxy server with the operating system by making an application programming interface call to the isolated process.

10. The non-transitory, computer-readable medium of claim 8, wherein the isolated process handles networking capabilities for a WebView component of an ANDROID operating system.

11. The non-transitory, computer-readable medium of claim 8, wherein the proxy server or application process detects that the network request is associated with the application process by at least recognizing a user identifier that is associated with the application process.

12. The non-transitory, computer-readable medium of claim 8, the stages further comprising:
   sending traffic from the proxy server to the VPN tunnel server, wherein the VPN tunnel server is configured to send the traffic to the destination server specified by the network request of the isolated process; and
   receiving response traffic at the proxy server, the response traffic being forwarded by the VPN tunnel server from the destination server.

13. The non-transitory, computer-readable medium of claim 8, wherein an identifier is shared between the isolated process and the application process, and wherein the proxy server only accepts network requests that include the identifier.

14. The non-transitory, computer-readable medium of claim 8, wherein the VPN tunnel server encrypts data associated with the network request and ensures that the user device meets rules required to perform the network request.

15. A system for creating a per-app virtual private network ("VPN"), comprising:
   a memory storage including a non-transitory, computer-readable medium comprising instructions; and
   a processor that executes the instructions to carry out stages of an application process on a user device, the stages comprising:
      executing an application process on a user device, the application process relying on an isolated process on the user device for network requests;
      registering a proxy server with an operating system of the user device, wherein the proxy server runs as part of the application process but separately from the isolated process;
      setting the isolated process to send its network requests to the proxy server;
      in an instance where the proxy server receives a network request from the isolated process and the network request is associated with the application process, replacing a socket function call with an alternate function that specifies an address of a VPN tunnel server; and contacting the VPN tunnel server to fulfill the network request at a destination server.

16. The system of claim 15, wherein the application process registers the proxy server with the operating system by making an application programming interface call to the isolated process.

17. The system of claim 15, wherein the isolated process handles networking capabilities for a WebView component of an ANDROID operating system.

18. The system of claim 15, wherein the proxy server or application process detects that the network request is associated with the application process by at least recognizing a user identifier that is associated with the application process.

19. The system of claim 15, the stages further comprising:

sending traffic from the proxy server to the VPN tunnel server, wherein the VPN tunnel server is configured to send the traffic to the destination server specified by the network request of the isolated process; and receiving response traffic at the proxy server, the response traffic being forwarded by the VPN tunnel server from the destination server.

20. The system of claim 15, wherein the VPN tunnel server encrypts data associated with the network request and ensures that the user device meets rules required to perform the network request.

* * * * *